W. M. JACOBS & S. L. PAYNE.
CUTTING MECHANISM FOR HARVESTING MACHINES.
APPLICATION FILED AUG. 7, 1909.

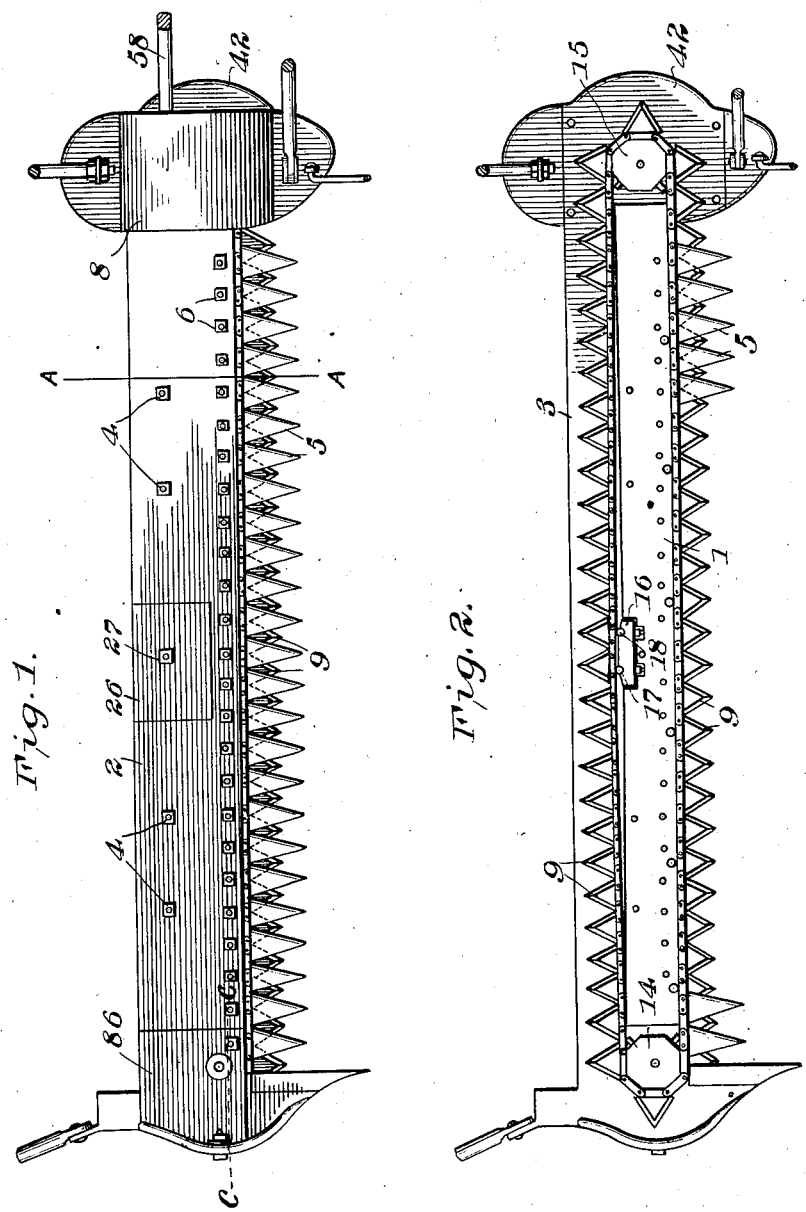

1,053,289.

Patented Feb. 18, 1913.

4 SHEETS—SHEET 2.

Witnesses
J. A. Bishop
M. B. Nichols

Inventor
William M. Jacobs
and
Stowell L. Payne
By
Wilson Kent Ramsey
Attorney

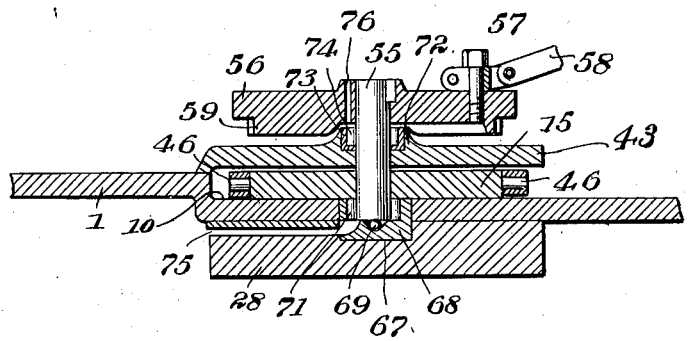
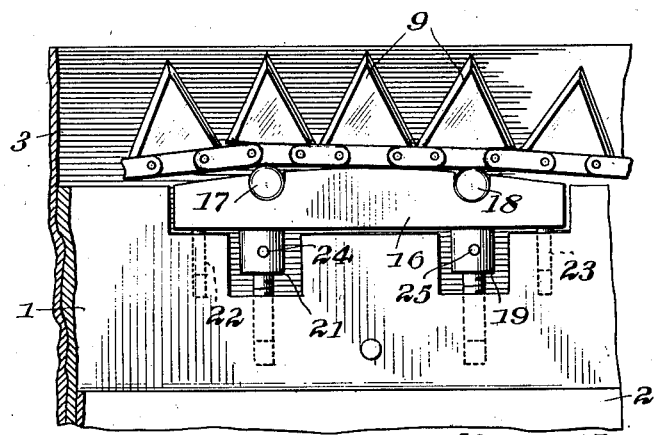
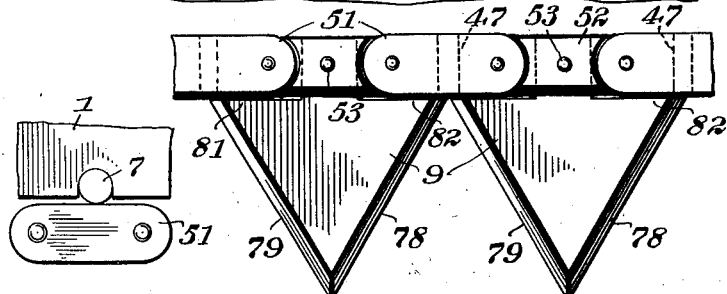
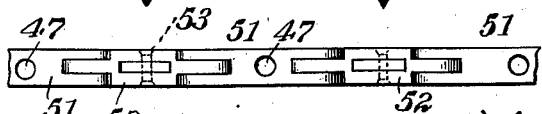

W. M. JACOBS & S. L. PAYNE.
CUTTING MECHANISM FOR HARVESTING MACHINES.
APPLICATION FILED AUG. 7, 1909.

1,053,289.

Patented Feb. 18, 1913.
4 SHEETS—SHEET 4.

UNITED STATES PATENT OFFICE.

WILLIAM M. JACOBS AND STOWELL L. PAYNE, OF VALE, OREGON.

CUTTING MECHANISM FOR HARVESTING-MACHINES.

1,053,289.  Specification of Letters Patent.  Patented Feb. 18, 1913.

Application filed August 7, 1909. Serial No. 511,707.

*To all whom it may concern:*

Be it known that we, WILLIAM M. JACOBS and STOWELL L. PAYNE, citizens of the United States, and residents of Vale, in the county of Malheur and the State of Oregon, have invented certain new and useful Improvements in Cutting Mechanism for Harvesting-Machines, of which the following is a specification.

This invention relates broadly to cutting mechanism for grass and grain harvesting machinery, and specifically to cutting devices for various types of mowing machines.

An object of the invention is to provide a cutting knife which moves continuously in one direction during its cutting operation; and to provide a driving mechanism which is capable of being reversed, to drive the cutting knife continuously in one direction until the drive mechanism is reversed.

A further object of the invention is to provide a cutting blade that will be operative when moving in either one of two directions of movement.

A further object of the invention is to construct a flexible chain cutter which is free to bend under influences of forces which are applied to the back of the chain, that is, the face opposite the cutting segments, but which is incapable of being bent from a straight line when the bending force is applied against the cutting points or edges of the section knives.

A still further object of the invention is to provide guard fingers which coöperate with the chain cutter, and which are provided with bearing rollers upon which the chain cutter rests.

Other objects of the invention are to provide novel features of construction and arrangement that will be more particularly pointed out in the following specification.

By reference to the drawings which form a part of this specification the device will be more specifically described, and the features of the invention will be more specifically pointed out in the appended claims.

Figure 3:
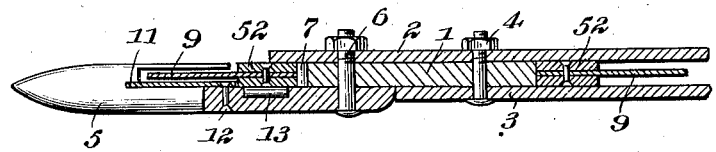
Figure 4:
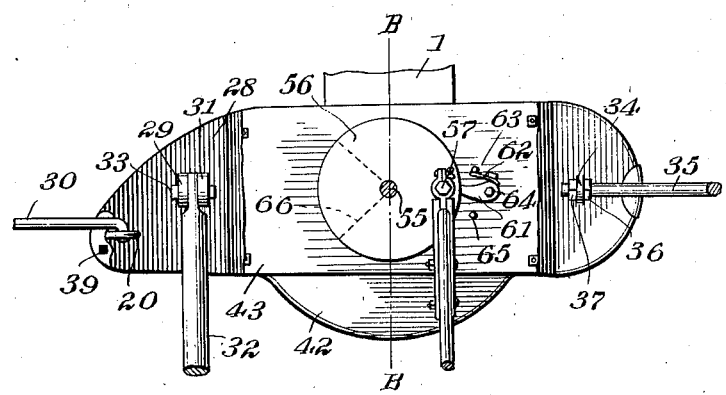
Figure 5:
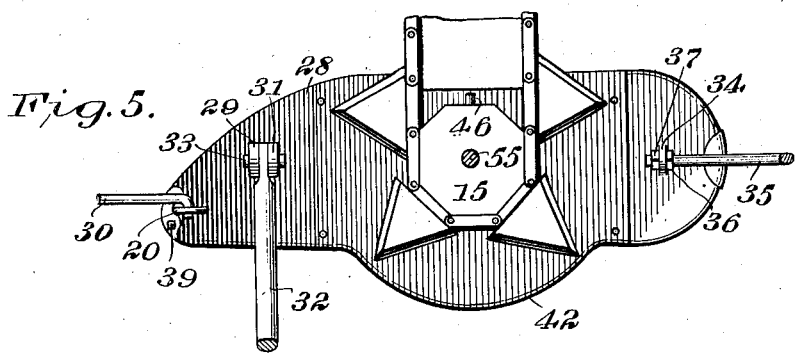
Figure 6:
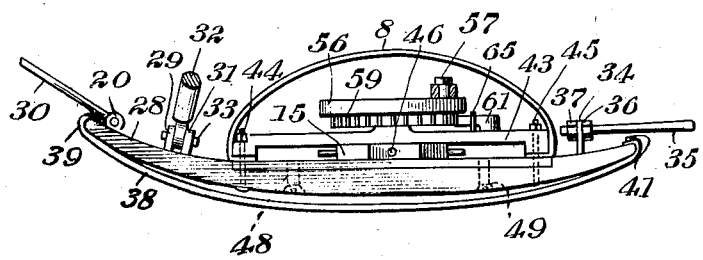
Figure 12:
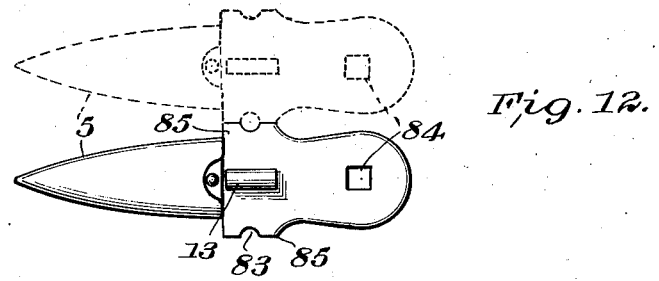
Figure 13:
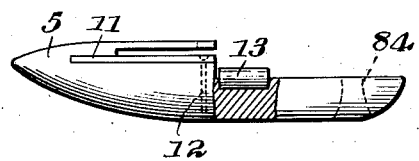
Figure 14:
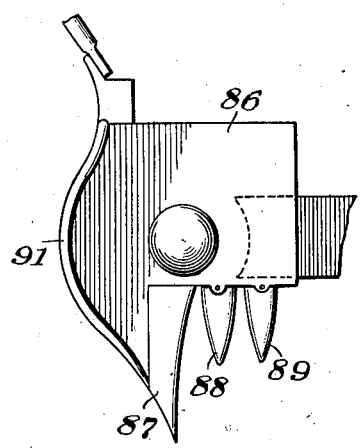
Figure 15:
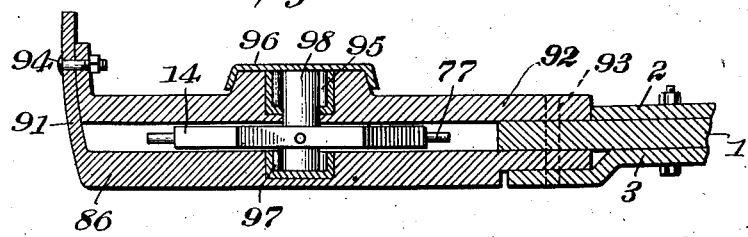

Referring to the drawings in which like characters represent like parts throughout the several figures:—Figure 1 is a plan view of a complete finger bar. Fig. 2 is a view of a finger bar with the top plate and part of the finger guards removed. Fig. 3 is a section on line A—A of Fig. 2. Fig. 4 is a plan view of the inner guide shoe with the protecting hood broken away to show the driving mechanism. Fig. 5 is an end view of the inner grain shoe. Fig. 6 is a side view of the inner grain shoe showing the driving sprocket for the chain cutter. Fig. 7 is a detail section on line B—B of Fig. 4. Fig. 8 is a detail view showing one of the vertical bearing rollers in the front face of the finger bar. Fig. 9 is a detail view of the cutter chain tightening device. Fig. 10 is a detail plan view of a portion of the cutter chain. Fig. 11 is a rear elevation of Fig. 10. Fig. 12 is a plan view of the guard finger. Fig. 13 is an elevation of Fig. 12 showing a portion of the guard in section. Fig. 14 is a plan view of the outer guard finger. Fig. 15 is a sectional elevation of the outer end of a cutter bar taken on section C—C of Fig. 1.

Referring particularly to Figs. 1, 2 and 3 of the drawings, a finger bar 1 is covered by a top plate 2 and an under plate 3. These three plates are secured in position by means of bolts 4, which pass through openings in the three bars referred to.

Guard fingers 5 are bolted through the finger bar and top plate by means of guard finger bolts 6, which serve the double purpose of holding the guard fingers in rigid relation to the cutting mechanism, and also bolting the top plate 2 more firmly to the finger bar 1, thereby forming an extremely stiff frame for the cutting mechanism. The front edge of the finger bar 1 is provided at intervals with small vertical rollers 7, (see Fig. 8) which are set in recesses cut in the front edge of the finger bar, and which are retained in position by means of a top plate 2 and the heel of the guard finger 5.

A cutter chain is provided with section knives 9 and is adapted to pass over the cutter plates 11, which are securely fastened to the guard fingers 5 by means of rivets 12. The guard fingers at various intervals are provided with horizontal bearing rollers 13, which are retained in recesses in the body portion of the guard finger. The cutter chain is held in operative position by means of the top plate 2, the front edge of the finger bar 1, and the rollers 7, and rests upon the rollers 13 which are carried in the guard fingers as has been set forth. The cutter chain is continuous, and passes around the sprockets 14 and 15, which are located at the ends of the finger bar. The plates 2 and 3 extend a sufficient distance from the rear of the finger bar 1 to cover the cutter knives, and to prevent them from coming in contact with any object or obstruction, should the mower be moved backward.

Referring to Figs. 2 and 9, an adjusting device for taking up the slack of the cutter chain, is located at the middle rear edge of the finger bar 1, and comprises a bar frame 16, which carries vertical rollers 17 and 18, that are set in recesses in the bar frame. The screw bolts 19 and 21 screw into the finger bar 1, and abut their heads against the rear face of the bar frame 16. Dowel pins 22 and 23, are carried by the frame 16, and coöperating with openings in the finger bar frame 1, form a guiding means for movement of the bar frame 16. The screw bolts 19 and 21 are provided with openings 25 and 24 respectively, which are adapted to receive a spanner, nail or any other convenient article, for turning the screw bolt to adjust the position of the tightening device. The top plate 2 is cut away over the portion covering the adjusting device, and a removable plate 26 is inserted and held in position by the bolt 27. This arrangement enables the operator of the machine to reach the adjusting screws 19 and 21.

Referring particularly to Figs. 5, 6 and 7, the inner guide shoe 28 is formed of cast metal and carries thereon lugs 29 and 31, which form a means whereby the brace rod 32, from the mower frame proper may be attached, by means of a drive pin 33, to the guide shoe 28. The rear end of this shoe is also provided with a lug 34, to which the brace rod 35 is bolted by means of adjusting nuts 36 and 37. The front of the guide shoe is provided with a loop 20, into which a hooked brace rod 30 engages. A steel runner 38 is attached to the lower face of the guide shoe by means of the bolts 39 and 41 at the front and rear respectively of the guide shoe. The finger bar 1 terminates in a rounding protecting head 42, which projects sufficiently inward to protect the section knives 9 as they pass around the sprocket wheel 15. A brace plate 43 is bolted through the finger bar 1, and guide shoe 28, by means of bolts 44 and 45. The stub screws 48 and 49 are passed through the shoe 28, and are screwed into the finger bar head 42 in order to more securely fasten the several parts together. This brace plate 43 is arched in order to provide a space in which the sprocket wheel 15 may be operated, and also to provide room for the cutter knives as they pass around the said sprocket wheel. The sprocket wheel 15 is formed of octagonal shape, and every other face carries a projecting pin 46, which is adapted to engage with the openings 47 in the transmission links 51 of the cutter chain. This wheel is carried on the driving shaft 55. Attached to the upper end of the driving shaft 55 is a drive wheel 56, into which is threaded a wrist pin 57. This pin is adapted to be connected with a universal pitman 58 which is attached to the driving mechanism of an ordinary mowing machine. The lower portion of the driving wheel 56, is provided with a ratchet wheel 59. A pawl 61 carries a spring 62 which rests against the pin 63. This pawl 61 engages the notches in the ratchet wheel 59, and permits the wheel 56 to rotate in only one direction. The pawl 61 may be removed from its pivot bolt 64 and turned over so that the spring 62 engages the pin 65. When the pawl is in this position, the wheel 56 can only be rotated in a direction which is opposite to that in which it is rotated when the parts are in the relationship first set forth. The drive wheel 56 is counterweighted at 66 on the side which is opposite to the wrist pin 57. A sheet metal protecting plate 8 is adapted to be secured beneath the brace plate 43 by means of the bolts 44 and 45, and effectually prevents the grass and grain after it is cut, from tangling with the driving mechanism.

Referring particularly to Fig. 7, which is a detail cross section upon the line B—B of Fig. 4, and shows bearings for the drive shaft 55: In this view the shoe 28 is recessed as at 67 to permit the steel bearing cup 68, which is inserted in an opening in the finger bar 1, to be seated firmly in the finger bar and shoe. A shaft 55 rests at its lower end on the steel ball 69 which takes the vertical thrust of the shaft. Surrounding the lower end of the drive shaft, and seated in the steel cup 68 are a series of small, steel vertical rollers which form a roller bearing for the driving shaft 55. The brace plate 43 is provided with an integral raised cup 72, which forms a seat for the steel cup 73, in which the small rollers 74 are contained. The guide shoe 28 and the cup 68 are provided with an oil hole opening 75. In the upper face of the drive wheel 56 there is a similar oil hole 76 for introducing oil to lubricate the upper roller bearing. In this view it will be noted that the finger bar 1 is bent, as at 10. This bend forms an offset portion which permits the major portion of the finger bar to lie in the same plane as the cutter chain, after the cutter chain leaves the sprocket wheel 15. The finger bar 1 is of the same thickness as the links of the cutter chain, and therefore it determines the width between the plates 1 and 2 which form the rear guideway for the cutter chain.

The cutter chain is disclosed in Figs. 10 and 11. The links 51, which are transmission links, are provided with openings 47 which extend entirely through the links. These openings are intended to receive the pins 46 of the drive sprocket 15, and also engage with the pins 77 in the idler sprocket 14, which is located at the outer end of the finger bar. The hole 47 extends entirely through the links 51 in order to permit any dust, or dirt that may get into the holes, to pass through the links and thereby prevent the opening 47 from becoming clogged. The section knives 9 are adapted to pass through slots in the links 52, and are permanently fastened in position by means of countersunk rivets 53. The section knife is formed of a triangular piece of sheet steel, sharpened at both edges as at 78 and 79. The outer corners of the triangular head project from the links 52 almost to the center line or middle portion of the transmission links 51, and the shoulders 81, 82 are adapted to rest against the front face of links 51 when the chain is straightened out into a straight line. Thus it will be seen that as against any force which comes upon the cutting edges or points of the section knives 9, the chain formed by links 51 and 52 acts as a rigid bar resisting the pressure. The chain is perfectly free to bend in a direction opposite to the cutting edges or points of the section knives, and therefore, there is no difficulty in passing the chain over the sprocket wheels. The feature of the rigidity of the cutting chain, to forces which are brought against the cutting faces, is of great importance, for it permits the cutter chain to act throughout its length as a rigid bar.

Referring to Figs. 12 and 13 which show detail views of the guard finger, the anti-friction roller 13 is shown in its relationship to the guard finger. This finger is provided with an opening 84, through which the bolt 6 passes when retaining the finger in position on the finger bar 1. Each side of the guard finger is formed with lugs 85 which extend sufficiently from the finger to abut a like lug on the adjoining finger when the guards are placed in position on the finger bar. Each of the lugs 85 is provided with semi-circular openings 83, which permit dust and dirt to work out of the pathway over which the cutter chain passes.

Fingers 14 and 15 illustrate the construction of the outer end of the complete finger bar, and also shows the construction of the outer guard finger. The plate 86 carries the outer guard finger 87, and the guards 88 and 89 which are molded integral with plate 86. The outer rim 91 is curved to form a cleared space for the section knives 9 as they pass around the sprocket wheel 14. The plate 92 is attached to the finger bar 1 by means of bolts 93, and at its outer end is attached to 91 by means of the bolt 94. This plate 92 carries in its upper surface a roller bearing 95, which is covered by a dust plate 96. The plate 86 is recessed, and contains a roller bearing 97 which is similar to the bearing 96. These roller bearings provide antifriction journals for the bearing shaft 98 which carries the sprocket wheel 14.

During the operation of our grass cutting knives, it may run in one direction until the cutting faces on one side of the section knives are all dulled, then the motion of the chain may be reversed and the sharp cutting faces on the opposite edge of the section knives may be brought into use. Thus it will be seen that we have provided a cutting mechanism for harvesting machines that has practically twice the effective life of the ordinary reciprocating cutter bar.

Having thus described the device what we claim as our invention is:—

1. In a machine of the class described, a cutter chain, said chain including carrier links, transmission links between said carrier links and of equal thickness thereto, sprocket slots in said transmission links, two-edged knives mounted in said carrier links, lateral shoulders on said knives, said shoulders extending substantially to the middle of the adjacent transmission links and adapted to contact with the faces of said transmission links when the cutter chain is extended in a straight line.

2. In a machine of the class described, the combination of a finger bar, an endless cutter chain, means for driving said cutter chain, positively adjustable means for tightening said cutter chain, said tightening means being encompassed by said chain and located in the plane thereof substantially midway the ends of the finger bar, said tightening means comprising a bar frame, contact rollers carried by said bar frame, and adjusting screws set in the finger bar.

3. In a machine of the class described, the combination of a finger bar, an offset portion on said finger bar, an endless cutter chain, two-edged knives mounted on said cutter chain, means for driving said cutter chain in two directions, said driving means including a sprocket wheel mounted in the offset portion of the finger bar, means for tightening said cutter chain, and adjustable means for limiting the direction of traveling movement of the cutter chain to either one of the said two directions, said limiting means consisting of a ratchet wheel in operative relation to said sprocket wheel, and adjustable detent means for said ratchet wheel.

4. In a machine of the class described, the combination of a finger bar, an offset portion on said finger bar; an endless cutter chain; two-edged knives mounted on said cutter chain; means for driving said cutter chain in two directions, said driving means including a sprocket wheel mounted in the offset portion of the finger bar, and a pitman having a flexible connection with said sprocket wheel; means for tightening said cutter chain; and adjustable means for limiting the direction of traveling movement of the cutter chain to either one of the said two directions, said adjustable means consisting of a ratchet wheel in operative relation to said sprocket wheel, and adjustable detent means for said ratchet wheel.

WILLIAM M. JACOBS.
STOWELL L. PAYNE.

Witnesses:
   JNO. P. HOUSTON,
   LEO. H. SCHMIDT.